Figure 1:
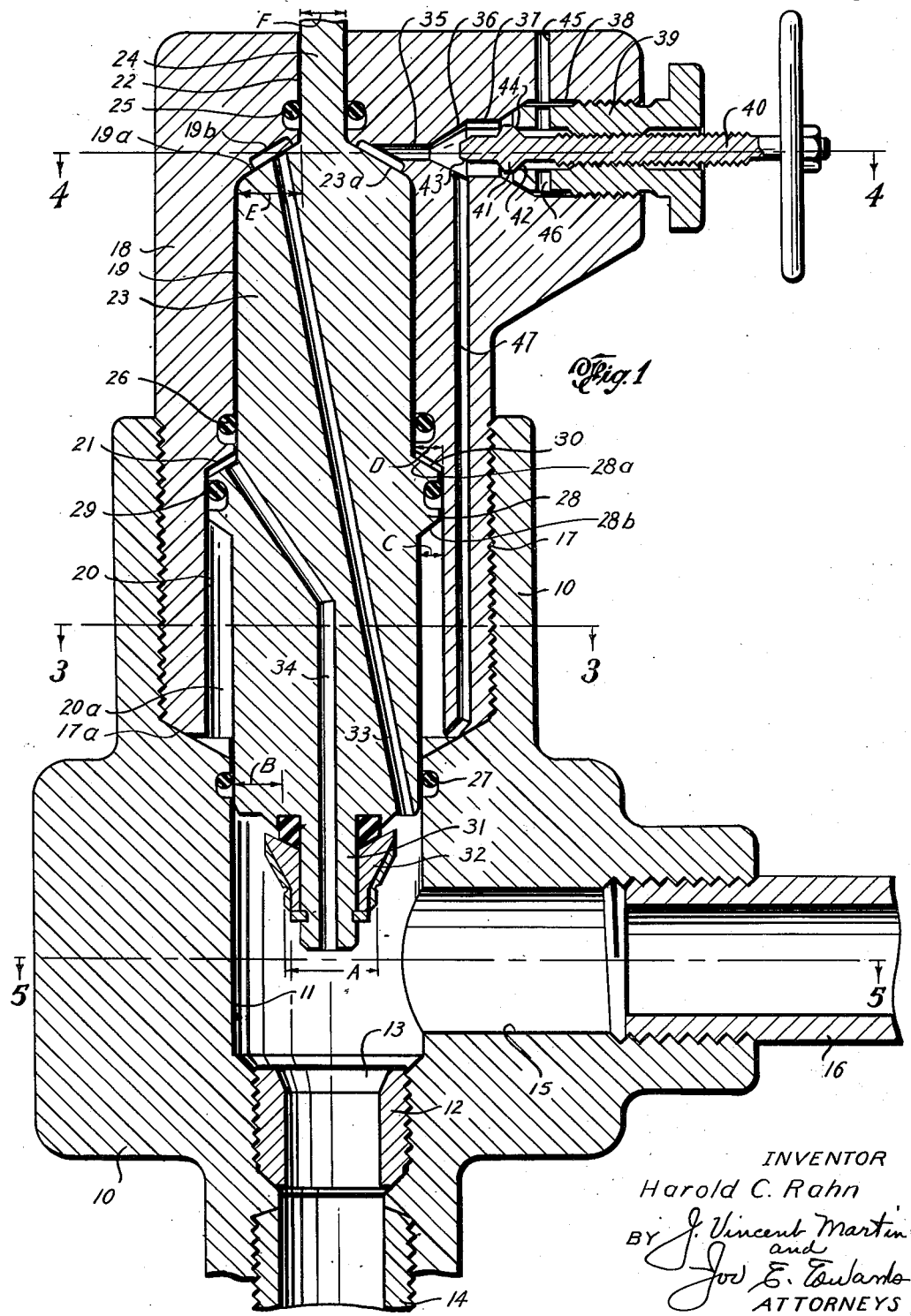

April 14, 1953 H. C. RAHN 2,634,754
PILOT CONTROLLED FLUID PRESSURE OPERATED VALVE
Filed Dec. 27, 1948 4 Sheets-Sheet 2

Harold C. Rahn
INVENTOR
J. Vincent Martin
and
BY Jos. E. Edwards
ATTORNEYS

April 14, 1953 H. C. RAHN 2,634,754
PILOT CONTROLLED FLUID PRESSURE OPERATED VALVE
Filed Dec. 27, 1948 4 Sheets-Sheet 3

Harold C. Rahn
INVENTOR

BY J. Vincent Martin
and
Joe E. Edwards
ATTORNEYS

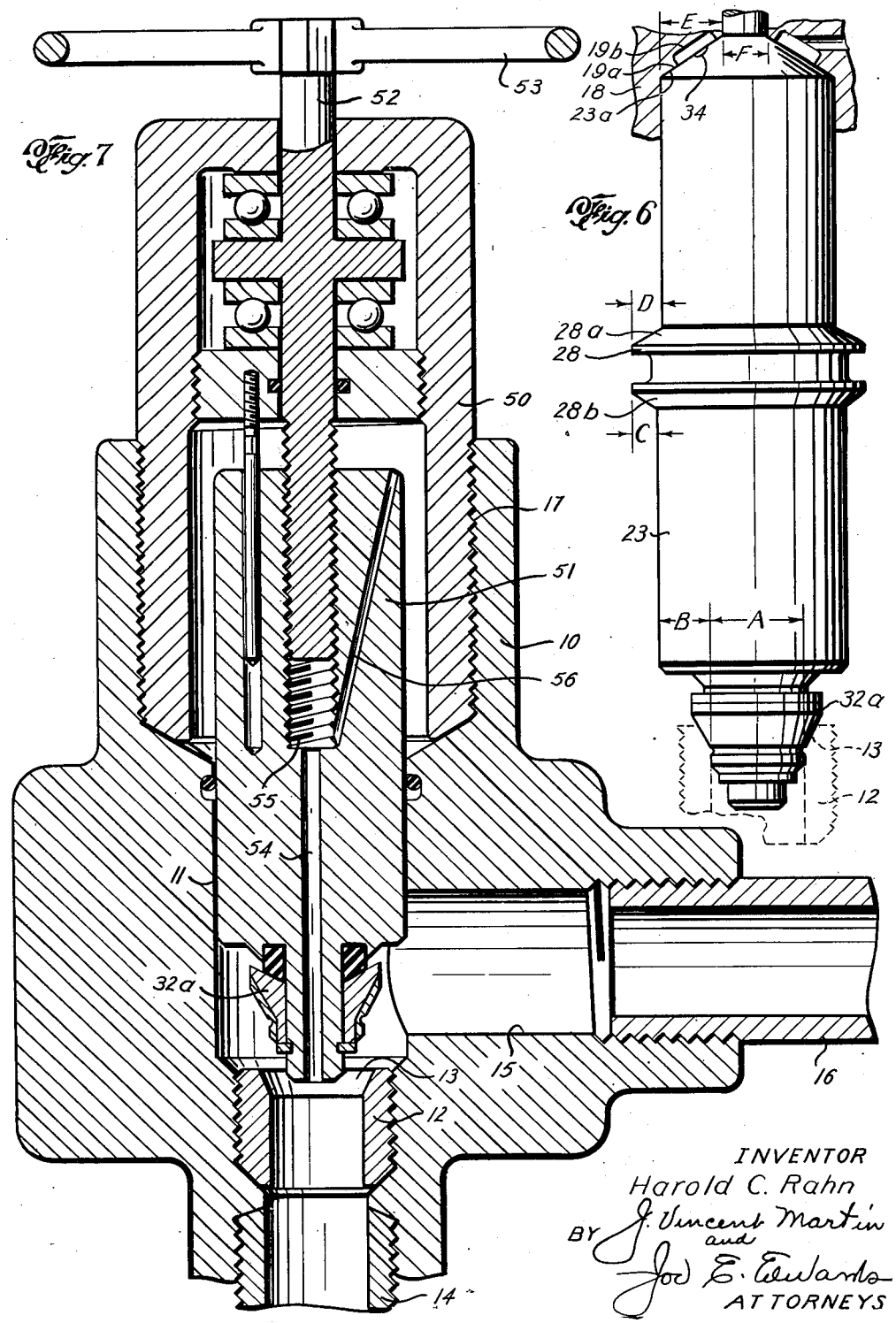

Patented Apr. 14, 1953

2,634,754

UNITED STATES PATENT OFFICE 2,634,754

PILOT CONTROLLED FLUID PRESSURE OPERATED VALVE

Harold C. Rahn, Houston, Tex., assignor to Oil Center Tool Company, Houston, Tex., a corporation of Texas Application December 27, 1948, Serial No. 67,288

7 Claims. (Cl. 137—658)

This invention relates to new and useful improvements in valve devices.

One object of the invention is to provide an improved valve for controlling the flow of pressure fluid through a flow line and having means for utilizing the pressure or energy of the fluid within the line for operating the valve whereby manual movement of the valve against such pressure by the operator is not required.

Another object of the invention is to provide an improved valve device wherein the valve element presents or exposes surfaces of predetermined areas on opposite sides thereof to the pressure fluid within the line, whereby the pressure of the controlled fluid may act upon such surfaces to produce movement of the valve element in accordance with the differential in effective areas of such surfaces, together with manually operable means for controlling the action of the fluid pressure on certain of the exposed surfaces to vary the effective forces acting on opposite sides of the valve element to thereby permit selective opening and closing of said valve element.

An important object of the invention is to provide an improved valve, of the character described, which is arranged to be actuated by the pressure of the fluid being controlled and which has means for controlling the rate of movement of the valve member, whereby the initial movement of the valve member in either direction is relatively rapid with the rate of movement of the valve being reduced or slowed as said valve approaches the end of its movement to thereby cushion the valve member and prevent battering thereof or damage thereto or to the valve seat engaged by said member.

Another object is to provide an improved valve device wherein the valve member has one of its surfaces which enters into the operation of the valve member exposed to the line pressure of the controlled fluid when the element is in an open position, said surface being automatically shut off from the line pressure when the valve element is closed, whereby the line pressure may be effectively employed in imparting movement to the valve in both directions and also whereby a smooth operation of the valve is assured.

An important object of the invention is to provide an improved valve, of the character described, having a manually controlled atmospheric vent associated with the valve element, with the arrangement being such that pressures across the valve element may be selectively unbalanced in either direction to open or close the valve as desired; the manual control being combined with an automatic control of pressure applied to certain surfaces of the valve element to produce efficient valve operation.

Still another object is to provide an improved valve, wherein the valve element has an enlarged annular portion having the line pressure acting on opposite sides thereof when the valve element is in an open position, together with means for unbalancing the pressures acting on opposite sides of the enlargement to move the valve to a closed position, closure of the valve automatically shutting off one side of the enlargement from the line pressure, whereby the effective area on the opposite side of said enlargement may be utilized to assist in moving the valve toward an open position.

Still another object is to provide an improved valve which is so constructed that its valve element is actuated by the pressure differential across said valve and having manually operable means functioning in conjunction with automatic means for controlling the application of pressure to certain areas of the valve element, whereby the effective areas acted upon by pressure may be selectively varied to control the movement of the valve element.

A particular object is to provide an improved valve, of the character described, wherein one of the effective surfaces of said valve is exposed to the line pressure when the valve element is in open position so that said area may function to assist in moving the valve element to a closed position, said area being automatically shut off from the line pressure when the valve element is in its fully closed position, whereby said area will not be exposed to line pressure to resist opening movement of said valve element.

A further object is to provide an improved valve device wherein the valve element is formed with fluid passages for conducting pressure to opposite sides of the valve element which passages may be varied in area to control the rate of movement of said valve element.

A still further object of the invention is to provide an improved valve element, either pressure or manually actuated, having means for establishing communication between the area beyond the element when said element is in a closed position and an upper surface of said valve element, whereby the relatively high line pressure being sealed by the valve is shut off from said upper valve surface and cannot act to resist opening movement of said valve.

The construction designed to carry out the invention will be hereinafter described together with other features of the invention.

Figures 2, 3:
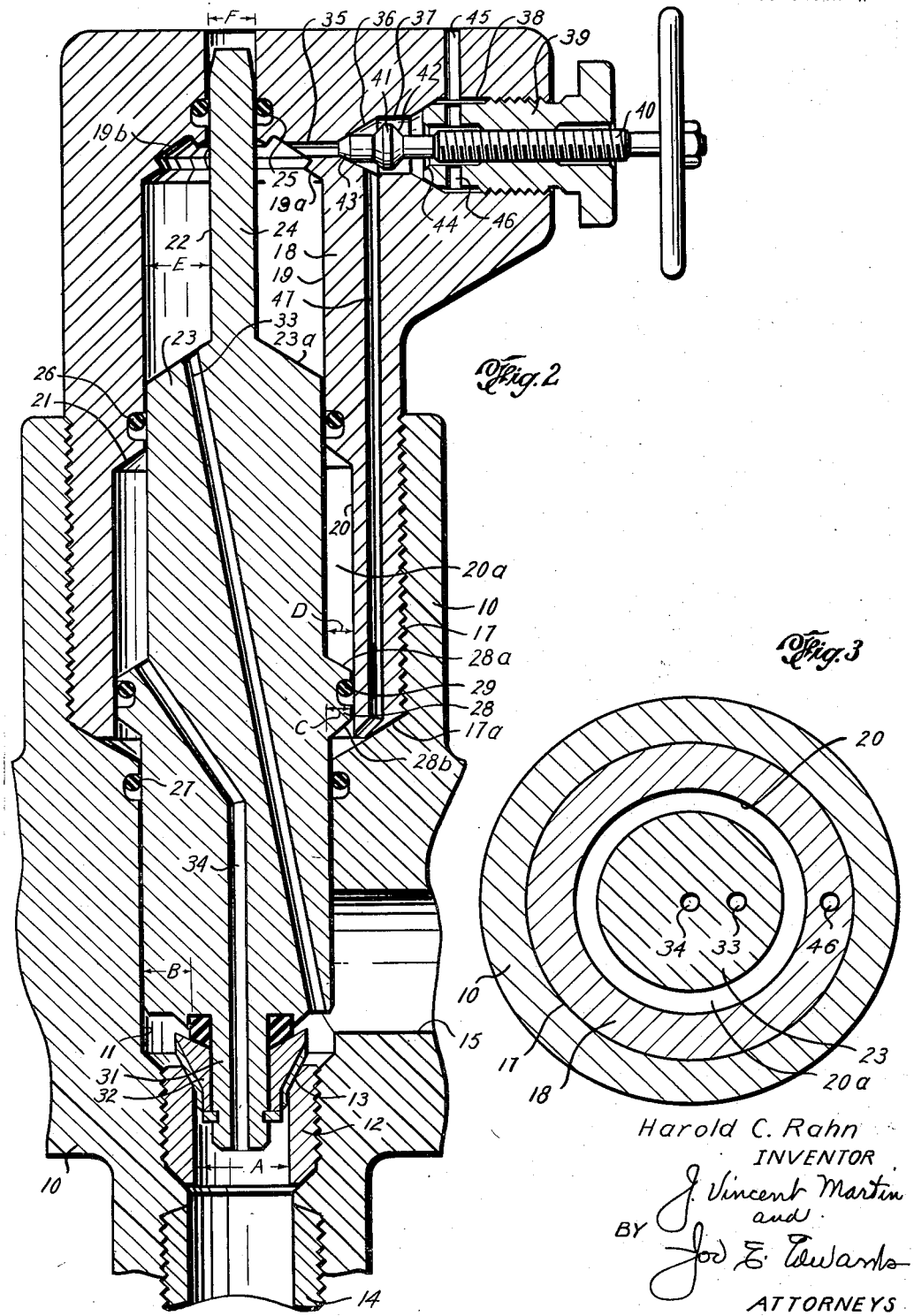
Figure 4:
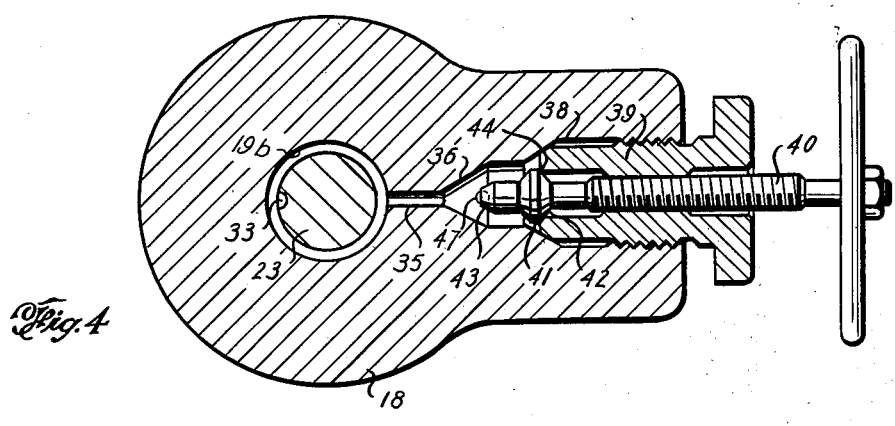
Figure 5:
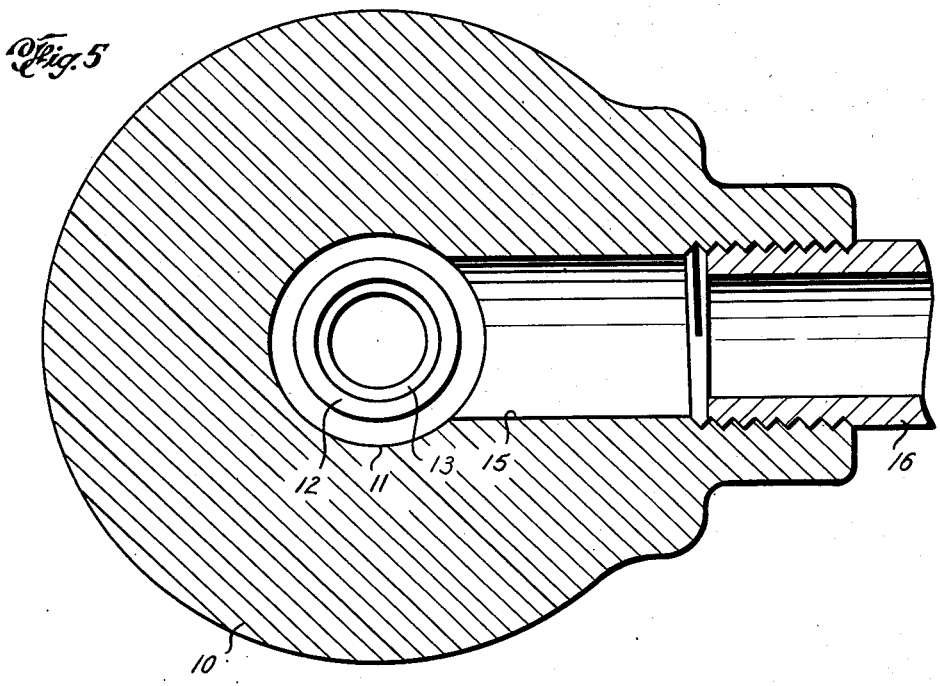

The invention will be more readily understood from a reading of the following specification and by reference to the accompanying drawings, wherein an example of the invention is shown, and wherein:

Figure 1 is a transverse vertical sectional view of a valve device constructed in accordance with the invention, and showing the valve member in its open position, Figure 2 is a similar view with the valve member in its closed or seated position, Figure 3 is a horizontal cross-sectional view taken on the line 3—3 of Figure 1, Figure 4 is a horizontal cross-sectional view taken on the line 4—4 of Figure 1, Figure 5 is a horizontal cross-sectional view taken on the line 5—5 of Figure 1, Figure 6 is a schematic diagram of the piston valve illustrating the effective areas which are acted upon by pressure in the operation of the valve, and Figure 7 is a view, similar to Figure 1, showing a modified form of the invention.

In the drawings, the numeral 10 designates a valve body having an axial bore 11 extending entirely therethrough. The lower portion of the bore is reduced and internally screw-threaded to receive an annular valve seat collar 12 having an annular seating surface 13 at its upper end. An outlet line 14 is connected in the extreme lower end of the bore 11 below the valve seat. A radially extending inlet port 15 is formed in the valve body and has its inner end communicating with the bore 11 above the valve seat and a pressure fluid line 16 is connected in the outer end of said port. Thus, a flow of fluid may occur through the line 16 into the bore 11 and past the valve seat 13 to escape through the outlet line 14. Ordinarily, the line 16 is adapted to conduct fluid under a relatively high pressure while the outlet line 14 is connected to a separator or some other vessel or line having a lower pressure than the fluid in the line 16.

The upper end of the bore 11 of the valve body is enlarged and internally screw-threaded to form a box as indicated at 17 and a cylindrical valve housing 18 has its lower end connected within the bore, the lower end of said housing engaging the internal annular shoulder 17a which is formed between the box 17 and the main bore 11. The valve housing is provided with an axial bore 19 which is illustrated as slightly smaller in diameter than the bore 11 within the valve body. However, the relationship between the bores 11 and 19 may vary in accordance with the particular operation to be obtained and therefore, this relationship is variable. The lower portion 20 of the bore of the housing is enlarged, whereby an internal annular shoulder 21 is formed within the housing. The extreme upper end of the bore 19 is reduced as indicated at 22 and an inclined annular shoulder or surface 19a is thereby formed within the upper portion of the housing. The surface 19a is preferably provided with an annular recess 19b.

A piston or valve element 23 is slidable within the bore of the housing 18, as well as within the bore 11 of the valve body and said piston is formed with an integral guide stem 24 at its upper end, the annular area 23a around the guide stem being inclined or tapered to form an inclined surface. The guide stem extends through the reduced portion 22 of the bore of the housing and a suitable packing ring 25, such as an O-ring, may seal off around the stem. The upper portion of the piston 23 has a close sliding fit within the bore 19 while the lower portion of said piston has a sliding fit within the bore 11 of the valve body. As illustrated, because the bore 19 is slightly smaller than the bore 11, the upper portion of the piston has a diameter which is slightly less than the diameter of the lower portion thereof; however, as stated, these diameters are variable within certain limits. An annular packing ring 26 seals between the upper portion of the piston and the bore 19 while a similar packing ring 27 seals between the lower end of the piston and the bore 11.

Intermediate its ends, the piston or valve element is formed with an annular enlargement or flange 28 and the external diameter of this flange is adapted to slidably fit within the enlarged portion 20 of the bore of the valve housing. Since the diameters at the upper and lower portions are different, the upper annular surface 28a is slightly larger than the lower annular surface 28b of said enlargement. A suitable sealing ring 29 is mounted within the peripheral portion of the enlargement or flange 28 and functions to seal between said flange and the bore 20. When the piston is in its upper position, as shown in Figure 1, the annular upper surface 23a of the piston just below the reduced stem 24 engages the annular shoulder 19a which is formed between the main portion 19 of the bore and the reduced portion 22 of said bore and the annular recess 19b forms a space between the surfaces 23a and 19a; in such position of the piston, the upper inclined surface 28a of the annular enlargement or flange 28 is spaced from the internal shoulder 21 within the bore of the valve housing whereby an annular space 30 is formed between these parts.

The lower end of the piston or element is formed with a depending integral shank 31 which has a flared valve member 32 suitably mounted thereon, a suitable resilient collar 32a surrounding the upper portion of the shank and engaging the valve member to permit a limited universal movement of the member to assure proper seating thereof. When the piston 23 is in its lower position, the valve member 32 is adapted to engage the inclined annular seat 13 within the lower end of the valve body bore 11, as shown in Figure 2, so as to shut off flow from the line 16 to the outlet 14. The valve member 32 has a diameter less than the diameter of the piston element 23 and the diameter of the valve seat and that portion of the valve member at its point of engagement with the seat which may be termed the portion within its seating diameter, is indicated at A in Figure 2. An elongate longitudinal passage 33 is formed in the piston element, extending from the lower end of the element to the upper surface 23a at the base of the guide stem 24. As the piston moves within the housing, fluid is by-passed from one side of the piston to the other and thus, the cross-sectional area of the passage functions to control the rate of movement of the piston and is therefore of a desired size to produce the desired rate of movement. A second passage 34 is also formed in the piston element 23 and extends through the shank 31 upwardly within the element 23 and has its upper end terminating in the upper surface 28a of the annular enlargement or flange 28, whereby pressure from beneath the valve member 32 may be conducted to the space 30 between the enlargement and the internal shoulder 21 within the bore of the valve housing. The cross-sectional area of this passage 34 is also subject to variation.

It is noted that when the valve is in its raised position, as shown in Figure 1, the pressure from the line 16 acts against the lower end of the valve member 32 and piston element 23 and urges the same toward its raised position. As schematically illustrated in Figure 6 the pressure acts upon the cross-sectional area A of the valve member 23 and on the area indicated at B in this figure. This pressure also acts through the passage 34 against the upper surface 28a of the annular enlargement or flange 28, which area is indicated at D. The pressure is also conducted through the passage 33 to the upper inclined surface 23a of the piston element indicated at E in Figure 6, but it is pointed out that the effective area E of the surface 23a, because of stem 22 having the area F exposed to atmosphere, is less than the effective areas A and B of the valve and piston at its lower end. Thus, the line pressure acting upwardly on areas A and B is opposed by the line pressure acting downwardly on areas D and E and although area E is less than the combined areas A and B, the combined area of E and area D are greater than areas A and B. Thus, if only these areas were subjected to the same pressure, the piston element would be moved downwardly. The area F of the stem 22 has its upper end constantly exposed to atmosphere and the diameter or area of this stem is important only in determining the effective area of the upper surface 23a of the piston 23.

In order to conduct the line pressure to the area C formed by the lower surface 28b of the flange 28 so as to add this area to areas A and B and thereby hold the valve in an open position, a lateral passage 35 is formed in the upper portion of the valve housing and extends from the annular recess 19b in the shoulder 19a against which the upper surface 23a of the piston 23 is adapted to abut. This passage has an annular seating surface 36 therein and beyond said surface is enlarged, as indicated at 37. Beyond the enlarged portion 37, the passage is further enlarged at 38 and a tubular valve seat member 39 is threaded into this enlarged outer end. A valve stem 40 is threaded within the tubular valve seat element, and has a double seating valve 41 formed with seating surfaces 42 and 43 at its inner end. The valve 41 is manually operated and is arranged to engage a valve seat 44 at the inner end of the tubular valve sleeve 39 when in its outer position (Figure 1). When moved to its inner position, the seating surface 43 of the valve 41 is arranged to engage the seat 36 to close the inner end of the passage 35. This position of the valve is illustrated in Figure 2 and in such position, the outer portion of the passage beyond the seat 36 may communicate with atmosphere through a vent passage 45 provided in the housing and vent ports 46 formed in the tubular valve sleeve, whereby that portion of the passage beyond the seat 36 may be vented to atmosphere.

A longitudinal passage 47 is provided within the wall of the valve housing 18 and has its upper end communicating with the passage 35 between the valve seat 36 and the tubular valve sleeve 39. The lower end of the passage 47 communicates with the annular space 20a which is formed between the enlarged portion 20 of the bore of the valve housing and the exterior surface of the piston element 23 below the annular enlargement or flange 28. It will be apparent that when the manually operated valve 41 is in the position shown in Figure 1 and engaging the seat 44, a communication between the passage 47 and the atmospheric vent 45 is prevented. However, in this position of the valve, the upper end of the passage 47 is in direct communication with the passage 35, and therefore, the pressure within this passage is conducted into the annular space 20a below the annular enlargement or flange 28 and acts against the area C formed by the undersurface 28b of said flange. As explained, this is the same pressure which acts through the passage 33 against the upper surface 28a or area D of the flange when the valve element 23 is in its raised position.

In operation, with the manually operated control valve 41 in its outer position, pressure from the line 16 is acting against the areas A, B, and C in an upward direction to urge the valve toward its open position. This same pressure is also acting against areas D and E in an opposite or downward direction to urge the valve toward a closed position. As has been explained, the combined effective area of areas A, B and C are greater than the combined effective area of areas D and E so that the piston 23 is maintained in its raised position with the valve 32 in an upper or unseated position. Therefore, so long as the manually operated valve 41 is engaging the seat 44 and line pressure is acting upwardly on the area C as in Figure 1, the line pressure will maintain the piston 23 and valve member in a raised position and this will permit a flow of fluid from the line 16 to the outlet line 14.

When it is desired to close the valve and engage the valve member 32 with its seat, the valve element 23 must move downwardly against the line pressure. To utilize the line pressure in effecting the closure or downward movement of the valve element, it is only necessary to operate the manually controlled valve 41 to move the same inwardly to the position shown in Figure 2. In such position, the seating surface 43 of the valve 41 is engaged with the seat 36 to shut off communication between the passage 35 and the longitudinal passage 47. This movement of the valve 41 disengages its outer surfaces 42 from the valve seat 44 and establishes communication between the upper end of the longitudinal passage 47 and the atmospheric vent passage 45 whereby the pressure within the annular space 20a below the enlargement or flange 28 and acting on the effective area C is vented to atmosphere.

As soon as the pressure acting beneath the flange 28 on the area C is vented to atmosphere through the passage 46, pressure across the piston is immediately unbalanced in a direction which will move the piston downwardly. As has been noted, the combined areas D and E on which pressure is acting downwardly are greater than the combined areas A and B and as soon as the pressure acting on the area C is vented, the piston is moved downwardly. Thus, when the manual valve 44 is moved to the position shown in Figure 2 to vent the pressure from the space 20a and acting upon the area C, the valve element 32 is immediately moved downwardly to its seated position. Obviously, this downward movement is accomplished by means of the line pressure.

It is pointed out that as the piston is moved downwardly, a by-pass of fluid through the passage 33 must occur and by controlling the size or cross-sectional area of this passage, the rate of movement of the piston may be controlled. Because the line pressure is relatively high, it is desirable to dampen or retard the movement to eliminate battering of the valve member and seat in closing and to eliminate excessive jar or shock at the end of its opening movement.

As the valve member 32 moves into the annular valve seat 12, the effective portion or area thereof which is exposed to line pressure is gradually and progressively reduced and it is desirable to relieve the pressure acting on the area D of the flange 28 so that a relatively slow seating of the valve member may occur. For this reason, the lower end of the passage 34 which extends from the upper surface 28a or area D is in advance of the valve member 32 and enters the valve seat member 12 in advance of said valve member. Therefore, as the valve approaches the seating surface 13 and its effective area A previously exposed to line pressure is progressively reduced, the pressure acting above the flange 28 on the area D may be released through the passage 34 into the lower pressure line 14 and this release is assisted by the suction or Venturi action produced at the valve seat by the entrance of the valve member 32 into the seat member 12. Just prior to engagement of the seat member 32 with the seating surface, the area D is subjected to the lower pressure in the line and the valve is slowly moved to its seat by the line pressure acting on area E, which area is only slightly larger than the area B and the small portion of area A still exposed to the line pressure at this time. The valve member 32 is thus slowly seated and is held so because the area E is greater than the area B which remains exposed to line pressure.

When it is desired to again unseat or open the valve, the manually operated control valve 41 is returned to the position shown in Figure 1, in which position the vent passage 45 is again closed and communication between the passage 47 and the passage 35 is reestablished. As soon as this occurs, the line pressure in the upper end of the bore 19 above the piston 23 may immediately flow into the annular space 20a below the annular flange or enlargement 28 so that the effective area C of the under side of said enlargement is added to the exposed effective area B of the piston. As noted area E is slightly larger than area B and holds the valve closed until the pressure is again admitted to area C and when this occurs area C is, in effect, added to area B and the combined areas B and C are greater than the area E resisting opening of the valve and the piston 23 is immediately moved upwardly. The piston element 23 is moved upwardly toward an open position with the rate of movement being again controlled by the size of the passage 33. It is noted that at the time that upward movement is begun, the area A of the valve member 32 is exposed to the lower pressure in line 14; also the lower end of the passage 34 is exposed to the low pressure line and there is substantially little pressure above the annular enlargement 28 acting on area D to resist upward movement. However, as soon as the valve member 32 is unseated, line pressure may flow through the passage 34 to again act upon area D and may also progressively act on the area A of the valve element 23 as said valve opens. As has been pointed out, with the valve opened, the combined effective areas A, B and C are greater than the combined effective areas D and E, and with the line pressure acting on all areas, the valve element is moved upwardly and maintained in its raised position.

The size or area of the passage 34 will control the rate at which pressure is conducted to or from the area D and this will to some extent effect the rate of movement of the piston so that the size of said passage may be varied to obtain the desired action. With respect to closing movement of the valve, it will be seen that when manual valve 41 is operated to admit pressure to the area C, the areas B and C will be subjected to pressure and upward movement will be resisted only by the area E because at this time the area D will not be exposed to line pressure. This will result in a sudden opening of the valve and a relatively rapid initial upward movement of the piston, but this rate of movement will be appreciably slowed as soon as the valve opens to admit line pressure to the area D. Thus, the valve will be opened with a snap action and will then move to a full open position at a slower rate to prevent the surface 23a from striking the shoulder 19a with excessive force.

From the foregoing, it will be seen that the valve is operated by the pressure or energy of the fluid being controlled. When the valve is open or in its raised position, pressures across the piston are acting in a manner to maintain the same in a raised position. Operation of the manual valve 41 merely shuts off admission of line pressure to the under side of the enlargement or area C and allows the pressure beneath said enlargement to be vented to atmosphere so that the pressures acting across the piston are unbalanced in a direction to move the valve to a closed position. During such movement, the rate of movement is controlled by the size of passage 33 and as the valve member approaches its seat, the pressure acting on area D is automatically changed until final seating of the valve completely shuts off the line pressure from said area. With this arrangement, proper seating of the valve is assured and also efficient subsequent opening thereof may be readily effected by the line pressure.

Upon seating of the valve member, pressure conditions across the piston are such as to maintain the valve in its closed position. When the manual valve 41 is returned to the position shown in Figure 1 to reestablish communication between the passage 35 and the passage 47, the pressure conditions across the piston are again changed to move the valve to its open position. It is, therefore, obvious that the line pressure is utilized, not only to maintain the valve in its open and closed position, but is also employed as the energy which imparts movement to the piston element 23 in both directions. The operation is accomplished by combining the manual opening and closing of the valve 41 with the automatic variation of pressure conditions acting on the upper surface 28b or area D of the enlargement 28, with the latter being produced by the arrangement of the passage 34 which alternatively communicates with the high line pressure or the lower outlet pressure.

As has been noted, the size of the passages 33 and 34 may be varied to control the rate of movement of the piston. It is also apparent that the effective seating diameter A of the valve member and its seat can be varied as desired. Also, the diameter of the piston and the bores 11 and 19 within which said piston operates may be varied so that the effective areas B and E are changed. Variation in the external diameter of the flange 28 will result in a variation in the effective diameters C and D and it is apparent that by properly arranging the different effective areas of the piston and valve, substantially any type of operation and rate of movement of the valve may be obtained.

In Figure 7, a modified form of the invention is shown wherein a manually operated valve is combined with the valve body 10. Where the line pressure in the inlet 16 is relatively high, it is desirable to employ the pressure actuated valve device shown and described in Figures 1-6, because ordinarily, a manual valve must be opened against line pressure. In the form shown in Figure 7, the novel passage arrangement whereby the upper end of the valve element is not exposed to line pressure when the valve is in a seated position, is illustrated. In this form, a valve comprising a valve housing 50 and a valve element 51 is adapted to be threaded into the box 17 of the valve body 10. The valve element is actuated by a rotatable valve stem 52 through the usual handwheel 53. The valve element 51 is movable within the bore 11 of the body and has a valve member 32a mounted thereon. An axial bore 54 extends upwardly from the lower end of the element 51 and communicates with the threaded bore 55 within which the stem 52 is disposed. An inclined passage 56 establishes communication between the bore 55 and the upper end of the valve element. Thus, when the valve member 32a is in a seated position, the upper end of the valve element 51 is exposed to the lower pressure in the outlet line 14 and is shut off from the relatively high pressure in the line 16. When the valve is to be opened, the opening movement is therefore against a relatively low pressure and as soon as the valve 32a is unseated, the line pressure is utilized across the element 51. With this arrangement, the line pressure is not acting in such manner that it must be overcome by the manual operation, which facilitates opening of said valve.

Thus, the valve shown in Figure 7 has the feature of automatically shutting off the line pressure acting to resist opening of the valve when the valve member is seated. Also, the housing 50 and valve are so constructed that they may be combined with the valve body 10 without any change in said body.

The improved valve device shown in the drawings has been illustrated and described with the piston and valve member operating in substantially a vertical or upright position. However, it is obvious that the valve may assume other positions depending upon the particular line in which said valve is connected and actually, the particular disposition of the device with respect to either a horizontal or vertical plane will have no effect on the operation as described herein.

The foregoing description of the invention is explanatory thereof and various changes in the size, shape and materials, as well as in the details of the illustrated construction may be made, within the scope of the appended claims, without departing from the spirit of the invention.

Having described the invention, I claim:

1. A valve device for controlling flow of pressure fluid through a flow line including, a valve body connected in said line and having a flow passage therethrough, an annular valve seat in said passage, a piston having a valve member at one end thereof and being movable with respect to the valve seat to engage or disengage the valve member with said seat for controlling flow through said passage, the combined effective cross-sectional areas of the valve member and one end of the piston being greater than the effective cross-sectional area of the opposite end of the piston, means for exposing opposite ends of the piston to the line pressure, said piston having an annular area thereon which is exposed to line pressure when the valve member is in an open position and which is disposed so that pressure thereon opposes the pressure acting against that end of the piston on which the valve member is mounted, a second annular area on the piston, and means to expose said second annular area to line pressure and disposed in a direction common to that end of the piston on which the valve member is mounted and being of such size that when combined with the latter end of the piston, exceeds the area of the opposite end and the first mentioned annular area of said piston, whereby when the piston, valve member and two annular areas on said piston are all exposed to line pressure the piston is urged in a direction unseating the valve member, and means for venting the pressure acting upon the second referred-to annular area on the piston to unbalance the pressure conditions across the piston and cause said piston to move to a position seating the valve member.

2. A valve device as set forth in claim 1, wherein the end of the piston having the valve member is directly exposed to the line pressure with the opposite end being exposed to the line pressure through a passage formed in the piston, the size of said passage functioning to control the rate of movement of the piston when pressures thereacross are unbalanced.

3. A valve device as set forth in claim 1, wherein the venting means and the means for applying pressure to the second annular area on the piston comprises a manually operable control valve.

4. A valve device as set forth in claim 1, together with a passage extending through the valve member and communicating with the first named annular area on the piston, whereby when the piston and valve element are in a position with the valve member unseated, said area is exposed to line pressure and also whereby when the valve member is seated, the passage extending through the valve member is automatically shut off from the line pressure.

5. A valve device as set forth in claim 1, together with a passage extending through the valve member and communicating with the first-named annular area on the piston whereby when the piston and valve element are in a position with the valve member unseated, said area is exposed to line pressure and also whereby when the valve member is seated said passage through the valve member is shut off from the line pressure, said venting means for venting the pressure acting upon the second annular area on the piston being a manually actuated control valve.

6. A valve device as set forth in claim 1, wherein the first annular area is exposed to line pressure through a passage which extends axially through the valve member and then through the piston to said first area, whereby when the valve is seated the passage is shut off from said line pressure and remains so while said valve member is in a seated position, seating of the valve also resulting in that portion of said valve member within its seating diameter being shut off from the line pressure.

7. A valve device as set forth in claim 1 wherein the first annular area is exposed to line pressure through a passage which extends axially through the valve member and then through the piston to said first area, whereby when the valve is seated the passage is shut off from said line pressure and remains so while said valve member is in a seated position, seating of the valve also resulting in that portion of said valve member within its seating dameter beng shut off from the line pressure, and also wherein the first and second annular areas on the piston are formed by an annular enlargement which is disposed intermediate the ends of said piston.

HAROLD C. RAHN.

References Cited in the file of this patent

UNITED STATES PATENTS

| Number | Name | Date |
|---|---|---|
| 240,982 | Dutton | May 3, 1881 |
| 263,731 | Shaw | Sept. 5, 1882 |
| 1,713,015 | Wilson | May 14, 1929 |
| 2,130,611 | Burdick | Sept. 20, 1938 |

FOREIGN PATENTS

| Number | Country | Date |
|---|---|---|
| 609,081 | France | May 3, 1926 |